March 26, 1940. W. T. DUNN 2,194,787
POWER TRANSMISSION
Original Filed July 15, 1935
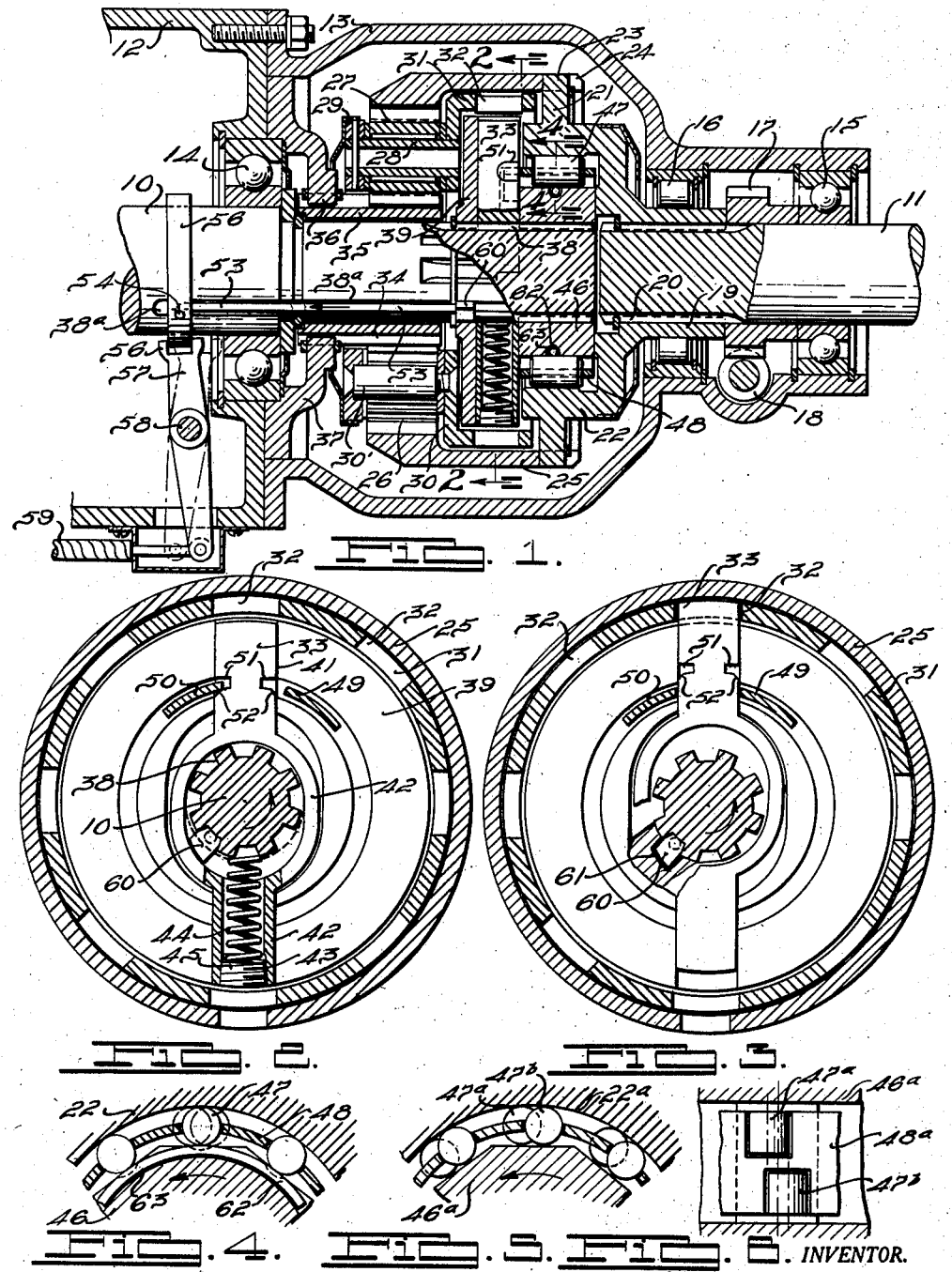
INVENTOR.
William T. Dunn.
BY
ATTORNEYS.

Patented Mar. 26, 1940

2,194,787

UNITED STATES PATENT OFFICE 2,194,787

POWER TRANSMISSION

William T. Dunn, Detroit, Mich., assignor to Chrysler Corporation, Highland Park, Mich., a corporation of Delaware Application July 15, 1935, Serial No. 31,321
Renewed June 28, 1939

22 Claims. (Cl. 74—260)

This invention relates to power transmission and refers more particularly to improvements in speed ratio changing mechanism especially adapted for use in driving motor vehicles.

One object of my invention is to provide an improved speed ratio changing mechanism preferably providing an overdrive, or a speed greater than 1 to 1 between driving and driven shafts in the transmission of power from the engine to the vehicle ground wheels.

More particularly, further objects of my invention are to provide a mechanism of the character aforesaid having improved characteristics of long life, quietness of operation, automatic response to the speed of vehicle travel, and relatively low cost.

Another object of my invention is to provide an automatic overdrive mechanism between driving and driven shafts incorporating releasable means in the normal direct drive between the shafts and wherein the releasable means provides a two-way direct drive prior to the synchronizing action of the members of the automatic clutch; also releasable means for the normal direct drive which may pass through a clutch, preferably of the roller type, to provide a two-way direct drive independently of the automatic clutch which controls the overdrive gear train.

A further object of my invention is to provide an improved arrangement of driving means providing the overdrive gear train, this gear train being controlled by an automatic clutch of the centrifugal force operated type, in combination with a releasable direct driving means responsive in its control to operation of the automatic clutch for permitting the driven shaft to overrun the driving shaft in synchronizing the rotational speeds of the automatic clutch structures. A further object of my invention is to provide an improved control for clutching means, which may be of the automatic centrifugal force type, for controlling the drive through a change speed gear train, this controlling means being so arranged that operation of the clutching means toward clutching engagement is prevented until relative movement takes place between the driving and driven shafts. This control is preferably arranged to prevent operation of the clutching means even though the clutching means is subjected to conditions otherwise tending to effect movement of the clutching means toward clutch engagement, especially where the clutching means includes a centrifugal force operated clutching element. Such arrangement prevents undesired wear of the clutching means and noises incident to the "ratcheting" effect of certain types of clutching means and has other advantages which will presently be more apparent.

Further features of my invention reside in an improved direct driving clutch for controlling an overdrive; also an improved direct driving clutch having rollers adapted to provide a two-way direct drive connection and a control therefor operable by movement of the centrifugal force actuated element of the overdrive control clutch.

A further object of my invention is to provide an automatic overdrive adapted to function in controlling the drive with a minimum of manual control necessary, my invention including a manually operated control on the automatic clutch, which control may be dispensed with if desired.

Further objects and advantages of my invention will be more apparent from the following detailed description of one illustrative embodiment of my invention, reference being had to the accompanying drawing, in which:

Fig. 1 is a sectional elevational view of my overdriving mechanism.

Fig. 2 is a transverse sectional elevational view taken approximately as indicated by the line 2—2 of Fig. 1.

Fig. 3 is a sectional elevational view taken approximately as indicated by the line 2—2 of Fig. 1.

Fig. 4 is a detail sectional elevational view taken as indicated by the line 4—4 of Fig. 1.

Fig. 5 is a view corresponding to Fig. 4 but illustrating a modified form of my direct driving control clutch.

Fig. 6 is a detail plan view of the Fig. 5 clutch looking down on the clutch rollers and cage.

Referring to the drawing, I have illustrated my overdriving mechanism operating between a power driving shaft 10 and a driven shaft 11. These two shafts may be arranged anywhere along the line of power transmission between the usual engine and driving ground wheels of the motor vehicle and inasmuch as such parts are well known, I have not illustrated them in my drawing. The shaft 10 preferably receives its drive from the usual change speed transmission mechanism which may be located in the casing 12 to the rear of which is located the casing 13 for housing the overdrive mechanism.

Shaft 10 is suitably rotatably journalled, one bearing therefor being shown at 14 while shaft 11 is rotatably journalled by bearings 15 and 16, the usual speedometer drive being taken from shaft 11 by the gearing 17 and 18 in a well known manner.

The driven shaft is provided with an enlarged forward extension coaxial with the aligned axes of shafts 10 and 11 and surrounding the rear end of shaft 10 and while this enlarged projection may be formed integrally with shaft 11 such structure is preferably built up for convenience of manufacture as follows. A hub 19 is drivingly secured to shaft 11 by the splines or teeth 20, this hub being formed with the cylindrical member 22. This latter member has an annular portion 21 formed with a plurality of circumferentially spaced radial projections 23 adapted to fit into rearwardly extending slots 24 of a cylindrical driving member 25 formed at the forward end with an internal gear 26 meshing with a plurality of circumferentially spaced planetary gears 27 mounted on axles 28 connected by the ring-like carriers 29 and 30. These carriers may also be connected intermediate a pair of the planetary gears by suitable spacing structures 30' and the carrier 30 is provided with a rearwardly extending driving member in the form of a cylindrical portion 31 thereof having a plurality of circumferentially spaced slots 32 adapted for clutching engagement with the centrifugal force operated clutching element 33 as will be presently more apparent.

The planetary gears 27 also mesh with a sun gear 34 carried by a sleeve 35 freely surrounding shaft 10 and non-rotatably secured by teeth 36 with a bracket 37 secured to the stationary casing 12.

The rear end of shaft 10 is provided with splined teeth 38 for drivingly engaging a cage 39 adapted to carry the clutching element or pawl 33 whereby the latter is rotated with the cage and capable of radial movement relative thereto in the cage guides 41. The pawl 33 has an inwardly extending yoked portion 42 surrounding shaft 10 and terminating in a diametrically opposite end portion 43 adapted to house a spring 44 acting between shaft 10 and an adjustable abutment screw plug 45 threaded in the outer end of the end portion 43. The spring 44 acts to yieldingly urge the pawl 33 into the position illustrated in Fig. 2, the shaft 10 serving to limit the movement of the pawl in this direction which is the disengaged position of the pawl with respect to its clutching position with one of the slots 32.

The pawl 33 is adapted for clutching engagement with a slot 32 when the rotational speeds of the pawl and slot are substantially synchronized and in order to facilitate this synchronizing action at the time of clutching engagement of pawl 33, I preferably provide a releasable two-way clutch between the driving and driven shafts to permit at least the necessary relatively small amount of relative overrunning movement between shafts 10 and 11 at the time of clutching engagement. A releasable clutch in the form of a roller clutch will be satisfactory for this purpose in order to permit the driven shaft to overrun the driving shaft for synchronizing the clutching element 33 with a slot 32.

This overrunning clutch comprises an outer cylindrical clutching portion provided by the aforesaid part 22 and an inner cam member 46 drivingly connected to shaft 10 through the splines 38, the intermediate rollers 47 acting between the clutch portions 22 and 46 and being together maintained in their properly spaced relationship by a roller retainer or spacer ring 48.

The spacer ring 48 is provided with a forwardly extending projecting portion in the form of forked extensions 49 and 50, the clutching element 33 closely fitting between these forked extensions when projected outwardly into clutching engagement with one of the slots 32 as illustrated in Fig. 3. These extensions 49 and 50 provide a latching means, or releasable holding means, for the clutching element 33 as will be presently more apparent.

The arrangement is such that when the centrifugal clutching element 33 is in its disengaged or fully retracted position illustrated in Fig. 2, the rollers 47 together with cage 48 are free to move rotatively in either direction as indicated by the dotted line position of a typical roller in Fig. 4 as when the cam 46 drives the cylindrical portion 22 or when the cylindrical portion drives the cam whereby the direct two-way drive may be transmitted between shafts 10 and 11. In order to permit this relatively small amount of relative movement between cam 46 and cylindrical portion 22 in either direction, the centrifugal clutching element 33 is formed with a pair of rearwardly opening grooves 51, these grooves extending toward each other at the rear face of element 33 in rotational alignment with cage projections 49 and 50 so that when element 33 is retracted as in Fig. 2, one or the other of projections 49 and 50 may enter a groove 51 depending on the direction of movement of rollers 47 in providing a drive relatively between shafts 10 and 11 in either direction. The lower faces of grooves 51 are preferably chamfered at 52 to assist in moving cage 48 to its neutral position at which time the rollers 47 are at the center of the cams of the cam member 46 so that clutch portions 46 and 22 may freely relatively move for an overrunning action between shafts 10 and 11 as will presently be more apparent.

For the purpose of providing a manually controlled means for locking out the overdrive, even at speeds otherwise sufficient to cause the clutching element 33 to move outwardly for engagement in one of the slots 32, I have provided the following mechanism. One of the splines 38, such as the spline 38ᵃ, is elongated forwardly to slidably accommodate a shifter rod 53 which is bent in a direction outwardly of shaft 10 at 54 to position this bent end in an opening of a collar 56 slidable on shaft 10. The collar 56 rotates with rod 53 and shaft 10 and for sliding the collar and rod, the collar is engaged by the forked end 56ᵃ of a lever 57 which is pivotally supported at 58 and adapted for manual manipulation at a convenient point through a suitable linkage such as the Bowden wire mechanism 59. The rear end of shifter rod 53 is provided with an enlarged key portion 60 adapted for selective manual position forwardly into a suitable recess 61 formed in the cage 39 or else rearwardly in the plane of yoke 42 so as to occupy the space between this yoke and shaft 10 and thereby serve as a stop holding clutching element 33 in the Fig. 2 position and preventing its outward movement. In Fig. 1 the key or stop 60 is illustrated in its forwardly adjustable position whereby the automatic clutch may operate at or above its critical speed of rotation of clutching element 33 and if desired this manual control may be dispensed with. In certain instances it is desirable to render the automatic overdrive inoperative and in such instances the motor vehicle driver may manipulate the Bowden wire 59 to move the stop 60 rearwardly and thereby prevent any outward movement of clutching element 33. Under the latter conditions it will be understood that a two-way direct drive between shafts 10 and 11 is provided through the medium of rollers 47 of the two-way roller clutch device having the aforesaid cam and cylindrical portions 46 and 22 respectively.

In the operation of the mechanism and assuming the parts are in the Fig. 1 position with the clutching element 33 in the Fig. 2 position and with the manually controlled stop 60 in its forward or inoperative position, it will be apparent that a two-way direct drive is provided through shafts 10 and 11, the rollers 47 being adapted to rotatably move into the approximate dotted line positions of Fig. 4 for the respective opposite directions of drive through the shafts 10 and 11.

When the motor vehicle is driven at or above a predetermined speed depending on the strength and setting of spring 44 and the effective mass of clutching element 33 tending to move outwardly by centrifugal force, the clutching element 33 will be urged outwardly by centrifugal force acting thereon. At this time it will be understood that normally a direct forward drive will be taking place between shafts 10 and 11, the rollers 47 and cage 48 moving slightly in the direction opposite to the direction of rotation of shaft 10 and cam 46 for positioning the cage projection 50 into the adjacent groove 51 of the clutching element. Therefore, when the critical speed for clutching element 33 has been passed, whenever the motor vehicle driver releases the usual accelerator pedal whereby driven shaft 11 tends to drive the driving shaft 10, the cylindrical clutch portion 22 will endeavor to overrun the cam portion 46 causing the rollers 47 to move toward their other dotted line position of Fig. 4 and cage 48 will, of course move with the rollers to disengage cage projection 50 from groove 51 whereupon clutching element 33 will immediately be projected outwardly with the outer cammed face of the clutching element rubbing on the inner cylindrical face of carrier extension 31. During such time the clutching element 33 will not have time to register with one of the slots 32 until these parts are substantially synchronized in their rotational speeds, the initial outward movement of clutching element 33 prior to synchronization taking up the clearance between the clutching element and carrier portion 31 and thereby moving the clutching element sufficiently to bring the chamfers 52 just outwardly beyond engagement with the cage extensions 49 and 50.

In this manner the cage 48 will be held in its neutral position just as soon as clutching element 33 has its initial outward movement, it being apparent that shaft 11 and clutching portion 22 may freely overrun shaft 10 and cam 46 for the purpose of synchronizing the rotational speeds of slots 32 and clutching element 33. The rotational speed of the clutching element will quickly drop to approximately that of slots 32 whereupon the clutching element will have a further outward movement in entering a slot 32 and thereby provide a positive clutching engagement between the clutching element and carrier 30. In this manner the driving shaft 10 is positively drivingly coupled for a two-way drive for driving the driven shaft 11 faster than the driving shaft, such drive passing from shaft 10 through the cage 39 thence through the clutching element 33 to the carrier 30, the planetary gears 27 rolling around the fixed sun gear 34 and causing the internal gear 26 and cylindrical driving member 25 to rotate along with the driven shaft 11 at a faster speed than driving shaft 10 depending on the value of the planetary gear train as will be presently understood. During this overdriving action the cage 48 will be held in its central or neutral position with respect to the cams of the cam member 46. The purpose of the chamfers 52 is to assist in moving the cage 48 to its neutral position during the aforesaid initial outward movement of clutching element 33.

The drive will continue as an overdrive until such time that the speed of motor vehicle travel is sufficiently reduced to urge the clutching element 33 inwardly by reason of spring 44 acting on the portion 43 of the clutching element. At such time the clutching element is retracted so that it is disengaged from a slot 32, the clutching element 33 moving inwardly to again align grooves 51 with the ends of cage extensions 49 and 50 at which time the original drive may take place in direct ratio between shafts 10 and 11 in either direction, one or the other of cage extensions 49 or 50 moving into one of the grooves 51 in camming rollers 47.

While the centrifugal force acting on rollers 47 will ordinarily be sufficient to urge the rollers outwardly against cylindrical portion 22 so that the rollers will quickly respond to the aforesaid tendency of shaft 11 to overrun shaft 10 for shifting cage 48, I may also assist in the outward positioning of rollers 47 particularly at relatively slow speeds by the addition of a spring wire 62 of substantially circular form fitting in a groove 63 in the face of cam member 46, this spring 62 yieldingly urging the rollers 47 outwardly. It will be noted that I have provided means for controlling the operation of the automatic clutch when the car is being driven directly through the overrunning clutch, such controlling means acting to prevent the clutch pawl 33 from moving outwardly under the influence of centrifugal force, even though the speed of rotation of the pawl is such as to otherwise cause the pawl to be projected outwardly. This control will be maintained on the pawl, above the critical speed, until such time as the car tends to drive the engine, resulting in release of the aforesaid latching means or projection 50 from groove 51, whereupon the pawl is free to move outwardly for engagement with one of the slots 32 when the members of the automatic clutch are synchronized as aforesaid. In this manner I have prevented, during the direct drive above the critical speed of the automatic clutch, ratcheting of the pawl together with inherent noise and wear of the clutch parts. Such arrangement, therefore, automatically renders the automatic clutch inoperative, even above its critical speed, until such time as a reversal of the normal direction of drive takes place between the driving and driven shafts 10 and 11 respectively.

In order to further reduce the amount of travel of the rollers and cage of the releasable or overrunning clutch device when moving from the neutral position in either direction for obtaining the two-way drive between the driving and driven shafts, I have illustrated a modified arrangement of the two-way releasable driving clutch in Figs. 5 and 6. It will be understood that in these figures the clutch illustrated may be readily substituted for the corresponding clutch shown and described in the previous embodiment of my invention and for the most part the operation of this clutch is the same in connection with the overdriving mechanism as previously recited.

In Figs. 5 and 6 a pair of axially spaced rollers 47ª and 47ᵇ are associated with each of the cam faces of the cam member 46ª, the outer cylindrical clutching portion 22ª corresponding to the aforesaid member 22 in Fig. 1. The cage 48ª is built around these rollers so that it will move as aforesaid with the pairs of rollers maintained in their properly spaced relationship. In Figs. 5 and 6 the rollers are illustrated in their neutral positions and on rotational movement of cage 48ª in either direction one of the rollers 47ª or 47ᵇ is required to move only a relatively small amount in locking up between the clutching portions 26ª and 22ª, it not being required that any roller need pass through its neutral position from one lock up position to the other lock up position for the two-way drive as in the case of the clutching device illustrated in Fig. 4. This arrangement will minimize the travel of cage extensions 49 and 50 in the grooves 51 as will be understood.

What I claim is:

1. In a motor vehicle drive, a driving shaft, a driven shaft aligned therewith, means including planetary gearing intermediate said shafts for driving said driven shaft at a speed greater than that of said driving shaft, said intermediate driving means including cooperating clutching members, one of which is movable by centrifugal force for clutching engagement with the other when the speeds of said clutching members are substantially synchronized, roller clutch means providing a two-way direct drive between said shafts, and means responsive to movement of said movable clutching member for controlling the movement of the rollers of said roller clutch means to render the roller clutch means inoperative for two-way drive between said shafts.

2. In an overdrive for motor vehicles, a driving shaft, a driven shaft, means providing a releasable direct drive between said shafts, means including an overdriving gear train having driving and driven parts thereof adapted for driving connection with said driving and driven shafts respectively, a speed responsive clutch controlling the drive through said overdriving gear train means and including relatively movable clutching structures respectively adapted for driving connection with one of said shafts and an element of said gear train, said releasable direct driving means comprising a two-way roller clutch having driving and driven portions thereof drivingly connected to said driving and driven shafts respectively, and means responsive to clutching movement of one of said clutching structures for rendering said roller clutch inoperative for a two-way drive between said shafts.

3. In an overdrive for motor vehicles, a driving shaft, a driven shaft, means providing a releasable direct drive between said shafts, means including an overdriving gear train having driving and driven parts thereof adapted for driving connection with said driving and driven shafts respectively, a speed responsive clutch controlling the drive through said overdriving gear train means and including relatively movable clutching structures respectively adapted for driving connection with one of said shafts and an element of said gear train, said releasable direct driving means comprising a two-way roller clutch having driving and driven portions thereof drivingly connected to said driving and driven shafts respectively, and means for operably connecting one of said clutching structures with said roller clutch for controlling movement of the rollers thereof.

4. In an overdrive for motor vehicles, a driving shaft, a driven shaft, means providing a releasable direct drive between said shafts, means including an overdriving gear train having driving and driven parts thereof adapted for driving connection with said driving and driven shafts respectively, a speed responsive clutch controlling the drive through said overdriving gear train means and including relatively movable clutching structures respectively adapted for driving connection with one of said shafts and an element of said gear train, said releasable direct driving means comprising a two-way roller clutch having driving and driven portions thereof drivingly connected to said driving and driven shafts respectively, means movable for spacing the rollers of said roller clutch during operation thereof between the driving and driven portions thereof, and means responsive to movement of one of said clutching structures for locking said spacing means against movement.

5. In a motor vehicle drive, a driving shaft, a driven shaft aligned therewith, means including planetary gearing intermediate said shafts for driving said driven shaft at a speed greater than that of said driving shaft, said intermediate driving means including cooperating clutching members, one of which is movable by centrifugal force for clutching engagement with the other when the speeds of said clutching members are substantially synchronized, means providing a two-way drive between said shafts prior to movement of said movable clutching member into said clutching engagement, means responsive to movement of said movable clutching member toward its clutching position for rendering said two-way driving means ineffective to provide relative movement between said shafts for synchronizing the speeds of said clutching members, and manually controlled means for preventing clutching movement of said movable clutching element.

6. In a motor vehicle drive, driving and driven aligned shafts, a fixed sun gear, a cylindrical member having an internal gear, a planetary gear meshing with said sun and internal gears and having a carrier, clutch means for drivingly connecting said driving shaft to said carrier, an extension member drivingly carried by said driven shaft, one of said members having a slot extending in the direction of the axis of said shafts, the other of said members having a radially extending projection engaged in said slot by relative axial movement of said members toward each other to drivingly connect said members.

7. In an overdrive for motor vehicles, a driving shaft, a driven shaft, means providing a releasable direct drive between said shafts, means including an overdriving gear train having driving and driven parts thereof adapted for driving connection with said driving and driven shafts respectively, a speed responsive clutch controlling the drive through said overdriving gear train means and including relatively movable clutching structures respectively adapted for driving connection with one of said shafts and an element of said gear train, said releasable direct driving means comprising a clutch having driving and driven portions thereof drivingly connected to said driving and driven shafts respectively, rollers between said clutch portions, and a spring yieldingly urging said rollers radially outwardly against said driven clutch portion.

8. In a motor vehicle drive, a driving shaft, a driven shaft aligned therewith, two-way clutch means releasably coupling said shafts for a direct two-way drive therebetween, said two-way clutch means being so constructed and arranged as to permit limited relative movement between said shafts in response to a reduction in the speed of one of said shafts relative to the speed of the other of said shafts, and means for drivingly connecting said shafts around said two-way clutch means to provide a speed ratio drive therebetween different from said direct drive, said speed ratio driving means including clutching means automatically establishing said speed ratio drive in response to said relative movement between said shafts.

9. In a motor vehicle drive, a driving shaft, a driven shaft aligned therewith, two-way clutch means releasably coupling said shafts for a direct two-way drive therebetween, said two-way clutch means being so constructed and arranged as to permit limited relative movement between said shafts in response to a reduction in the speed of one of said shafts relative to the speed of the other of said shafts, and means for drivingly connecting said shafts around said two-way clutch means to provide a speed ratio drive therebetween different from said direct drive, said speed ratio driving means including clutching means operable in response to a predetermined speed of at least one of said shafts to automatically establish said speed ratio drive when said relative movement takes place between said shafts.

10. In a motor vehicle drive, a driving shaft, a driven shaft aligned therewith, two-way clutch means releasably coupling said shafts for a direct two-way drive therebetween, said two-way clutch means being so constructed and arranged as to permit limited relative movement between said shafts in response to a reduction in the speed of one of said shafts relative to the speed of the other of said shafts, and means for drivingly connecting said shafts around said two-way clutch means to provide a speed ratio drive therebetween different from said direct drive, said speed ratio driving means including clutching means operable in response to predetermined relative speeds of said shafts to automatically establish said speed ratio drive when said relative movement between said shafts takes place.

11. In a motor vehicle drive, a driving shaft, a driven shaft aligned therewith, two-way clutch means releasably coupling said shafts for a direct two-way drive therebetween, said two-way clutch means being so constructed and arranged as to permit limited relative movement between said shafts in response to a reduction in the speed of one of said shafts relative to the speed of the other of said shafts, means for drivingly connecting said shafts around said two-way clutch means to provide a speed ratio drive therebetween different from said direct drive, said speed ratio driving means including clutching means automatically establishing said speed ratio drive in response to said relative movement between said shafts, and manually controlled operating means for rendering said clutching means inoperative.

12. In a motor vehicle drive, a driving shaft, a driven shaft aligned therewith, releasable direct drive roller clutch means between the driving and driven shafts, supplemental driving means for driving the driven shaft from the driving shaft at a speed ratio different than said direct drive, said supplemental driving means including automatically engageable clutching means for controlling the drive therethrough, said automatic clutching means including relatively movable clutching members, and means for controlling the operation of the automatic clutching means so constructed and arranged as to prevent relative movement of said clutching members toward their clutching engagement, until said roller clutch means operates to release the drive from said driving shaft to said driven shaft.

13. In a motor vehicle drive, a driving shaft, a driven shaft aligned therewith, releasable direct drive roller clutch means between the driving and driven shafts, said releasable direct drive means being so constructed and arranged as to permit relative movement between said shafts in response to a reduction in the speed of one of said shafts relative to the speed of the other of said shafts, supplemental driving means for driving the driven shaft from the driving shaft at a speed ratio different than said direct drive, said supplemental driving means including second clutching means for controlling the drive therethrough, said second clutching means including clutching members one of which is adapted for centrifugal force movement into engagement with the other, and means for controlling the operation of the second clutching means so constructed and arranged as to prevent centrifugal force movement of said movable clutching member toward the other of said clutching members until said roller clutch means operates to release the drive from said driving shaft to said driven shaft.

14. In a motor vehicle drive, a driving shaft, a driven shaft aligned therewith, direct-driving roller clutch means between the driving and driven shafts, supplemental driving means for driving the driven shaft from the driving shaft at a speed ratio faster than said direct drive, said supplemental driving means including automatically engageable clutching means for controlling the drive therethrough, and means including latching means operably associated with said automatic clutching means for controlling the operation of the automatic clutching means, and so constructed and arranged as to prevent operation of the automatic clutching means until said roller clutch means operates to release the drive from said driving shaft to said driven shaft.

15. In a motor vehicle drive, a driving shaft, a driven shaft aligned therewith, direct drive roller clutch means between the driving and driven shafts, supplemental driving means for driving the driven shaft from the driving shaft at a speed ratio different than said direct drive, said supplemental driving means including second clutching means for controlling the drive therethrough, said second clutching means including relatively movable clutching members one of which is adapted for movement in response to centrifugal force acting thereon, and means for controlling the operation of the second clutching means so constructed and arranged as to prevent relative movement of said clutching members toward their clutching engagement, until said releasable drive means operates to release the drive from said driving shaft to said driven shaft, said controlling means including an element releasably engaging said centrifugal force operated clutching member during said direct drive.

16. In an overdrive for motor vehicles, a driving shaft, a driven shaft, means providing a releasable direct drive between said shafts, means including an overdriving gear train having driving and driven parts thereof adapted for driving connection with said driving and driven shafts respectively, a speed responsive clutch controlling the drive through said overdriving gear train means and including relatively movable synchronously engageable clutching structures respectively adapted for driving connection with one of said shafts and an element of said gear train, means operably connecting one of said clutching structures with said direct drive means for rendering the latter inoperative after movement of this clutching structure to accommodate synchronization of said clutching structures, and manually operated means for preventing operation of said speed responsive clutch.

17. In an overdrive for motor vehicles, a driving shaft, a driven shaft, means providing a releasable direct drive between said shafts, means including an overdriving gear train having driving and driven parts thereof adapted for driving connection with said driving and driven shafts respectively, a speed responsive clutch controlling the drive through said overdriving gear train means and including relatively movable synchronously engageable clutching structures respectively adapted for driving connection with one of said shafts and an element of said gear train, means operably connecting one of said clutching structures with said direct drive means for rendering the latter inoperative after movement of this clutching structure to accommodate synchronization of said clutching structures, and manually operated means including a locking member engageable with one of said clutching structures for preventing operation of said speed responsive clutch.

18. In a clutch control for drivingly connecting driving and driven shafts, positively engageable clutch structures one movable toward the other, means including said clutch structures when engaged for transmitting drive from one of said shafts to the other, a roller clutch comprising inner and outer roller clutch members, means including said roller clutch for transmitting drive from one of said shafts to the other, said roller clutch having clutch rollers and a roller cage having a blocker portion thereof engageable with said movable clutch structure to control movement thereof toward the other of said clutch structures.

19. In a clutch control for drivingly connecting driving and driven shafts, positively engageable clutch structures one movable toward the other, means including said clutch structures when engaged for transmitting drive from one of said shafts to the other, a roller clutch comprising inner and outer roller clutch members, means including said roller clutch for transmitting drive from one of said shafts to the other, said roller clutch having clutch rollers and a roller cage having a blocker portion thereof engageable with said movable clutch structure to control movement thereof toward the other of said clutch structures, at least one of said drive transmitting means comprising a planetary gear train.

20. In a motor vehicle drive, a driving shaft, a driven shaft aligned with the driving shaft, positively engageable clutch structures one movable toward the other, means including said clutch structures when engaged for transmitting speed ratio drive from one of said shafts to the other, a roller clutch comprising inner and outer roller clutch members, means including said roller clutch for transmitting drive at a speed ratio different from that aforesaid from one of said shafts to the other, said roller clutch having clutch rollers and a roller cage having a blocker portion thereof adapted to control movement of said movable clutch structure toward the other of said clutch structures.

21. In a motor vehicle drive, a driving shaft, a driven shaft aligned with the driving shaft, positively engageable clutch structures one movable toward the other, means including said clutch structures when engaged for transmitting a relatively fast drive from the driving shaft to the driven shaft, a roller clutch comprising inner and outer roller clutch members, means including said roller clutch for transmitting a relatively slow drive from the driving shaft to the driven shaft, said roller clutch having clutch rollers and a roller cage having a blocker portion thereof adapted to control movement of said movable clutch structure toward the other of said clutch structures.

22. In a motor vehicle drive, a driving shaft, a driven shaft aligned with the driving shaft, positively engageable clutch structures one movable toward the other, means including said clutch structures when engaged for transmitting drive from one of said shafts to the other, a roller clutch comprising inner and outer roller clutch members, means including said roller clutch for transmitting drive from one of said shafts to the other, said roller clutch having clutch rollers and a roller cage member, one of the members aforesaid having a blocker portion thereof adapted to control movement of said movable clutch structure toward the other of said clutch structures.

WILLIAM T. DUNN.